April 15, 1924.
J. KELLEY ET AL
VALVE STRUCTURE FOR PNEUMATIC TIRES
Filed April 23, 1923
1,490,113
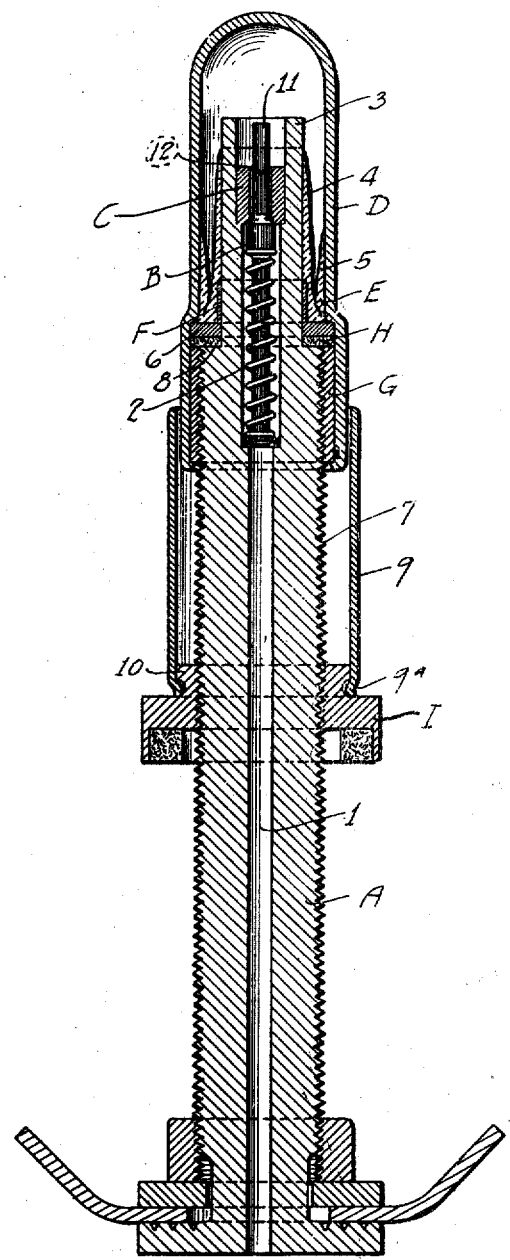
INVENTORS
John Kelley,
& Charles Raymond.
By Bakewell ...
ATTORNEYS Patented Apr. 15, 1924.

1,490,113

UNITED STATES PATENT OFFICE.

JOHN KELLEY AND CHARLES RAYMOND, OF ST. LOUIS, MISSOURI.

VALVE STRUCTURE FOR PNEUMATIC TIRES.

Application filed April 23, 1923. Serial No. 633,939.

*To all whom it may concern:*

Be it known that we, JOHN KELLEY and CHARLES RAYMOND, citizens of the United States, residing in the city of St. Louis, State of Missouri, have invented a certain new and useful Improvement in Valve Structures for Pneumatic Tires, of which the following is a full, clear, and exact description, such as will enable others skilled in the art to which it appertains to make and use the same.

This invention relates to valve structures of the kind that are used on pneumatic tires of the type that consist of a tubular casing filled with air and of the type that comprises a split casing that surrounds an inner tube filled with air.

The conventional valve structure that is now generally used on pneumatic tires of the type that comprise an inner tube and an outer casing, consists of a valve stem connected to the inner tube in such a way that it projects inwardly through the felloe of the wheel on which the casing of the tire is mounted, a spring-pressed valve in said stem that is relied upon to retain the air in the inner tube, a removable valve cap mounted on a reduced portion at the upper end of the stem that is used to prevent dirt from entering the air passageway in the stem and a tubular-shaped dust cap mounted on the stem and constructed in such a way that it encases the exposed portion of the stem and the valve cap thereon.

Owing to the fact that the air valve is a small, delicate part, provided with a rubber portion that bears against a metal valve seat, it is practically impossible to keep the valve tight and in operative condition for an extended period, on account of the tendency of the rubber portion of the valve to wear or cut and be rendered ineffective, when a particle of dirt collects on the valve seat which is of relatively small area. The result is that many automobile tires are destroyed by using same when the inner tubes are not properly inflated, as the average tire user will not take the time and be subjected to the annoyance of inflating an inner tube at frequent intervals and removing the air valve and replacing it with a perfect valve provided with an unworn or uncut rubber portion.

The main object of our invention is to provide a valve structure for pneumatic tires that will effectively maintain the required pressure in the tire.

Another object is to provide a valve structure for pneumatic tires in which the means that retains the pressure in the tire is of sufficiently rugged design to eliminate the possibility of its wearing out quickly or being rendered ineffective by a particle of dirt collecting on same.

And still another object is to provide a valve structure for pneumatic tires which is of such design that it is not necessary to use two caps on the stem, as is the usual practice with a conventional pneumatic tire valve structure. Other objects and desirable features of our invention will be hereinafter pointed out.

To this end we have devised a valve structure for pneumatic tires that is composed of a valve stem which is adapted to be connected either to a tubular casing or to the inner tube of a tire provided with a split casing, a removable cap on said stem that encases the upper portion of same, a flexible device for sealing the space between said stem and cap constructed in such a way that it is maintained in operative condition by the internal pressure in said cap produced by air which escapes through the air passageway in the stem, and means for preventing the air in the tire rushing out through the air passageway in the stem when said cap is removed. The means last referred to preferably consists of an air valve arranged in the air passageway in the stem which is constructed in such a way that it will unseat automatically, during the operation of inflating the tire, and while the function of said valve is to retain the pressure in the tire, it is not relied upon solely to seal the tire. On the contrary, the sealing of the tire is effected by a flexible device of rugged design which is so constructed and arranged that the air which escapes from the tire past said air valve will exert pressure on said sealing device and cause it to effectively seal the joint or space between the exterior of the stem and the interior of the cap that encases the upper portion of the stem.

The figure of the drawing is a vertical sectional view of a valve structure for pneumatic tires constructed in accordance with our invention.

Referring to the drawings, A designates a metal valve stem that is adapted to be connected in any preferred manner to a tubular tire casing or to the inner tube of a pneumatic tire of the type that is now generally used on power operated vehicles. 1 designates an air passageway in said stem through which air is introduced into the tire, B designates an air valve in said air passageway provided with a spring 2 that normally presses the valve against a seat C arranged in the air passageway 1 in the stem A and D designates a removable cap that encases the upper portion of the stem A. The cap D is similar in general design to the dust cap of the conventional pneumatic tire valve structure and is provided with a closed upper end and a side wall portion of slightly greater diameter than a reduced portion 3 at the upper end of the stem A, thus forming an annular space between the cap D and the reduced portion 3 at the upper end of the stem. In order to seal this annular space effectively and cut off the escape of air through the joint between the cap D and the stem A on which it is mounted, we arrange a flexible sealing device E between the cap D and the reduced portion 3 of the stem in such a way that the internal pressure in the cap D holds said sealing device pressed tightly against the exterior of the stem A.

The particular design of the air valve B, the cap D and the sealing device E is immaterial, so far as our broad idea is concerned, so long as the valve B is of such design that it will prevent the air from rushing out of the tire or escaping rapidly from the tire when the cap D is removed, and so long as the cap D and sealing device E are of such design that air can escape from the upper end of the air passageway 1 in the stem A and exert pressure on the device E in a direction to cause it to seal the joint between the cap D and stem A on which it is mounted. In the preferred form of our invention, as herein illustrated, the portion of the valve B that acts on the valve seat C is constructed of metal, as said valve is not relied upon to maintain the pressure in the tire, and the cap D is so constructed that when it is arranged in its normal position on the stem A, the top portion of said cap will be spaced away from the upper end of the stem A and an annular space will be formed between the interior of said cap and the reduced portion 3 of the stem. The sealing device E is arranged in the annular space between the cap and the reduced portion 3 of the stem and it is preferably provided with two annular flexible portions 4 and 5 arranged in concentric relation and spaced apart so that the internal pressure in the cap D will press the annular portion 4 tightly against the exterior of the reduced portion 3 of the stem and will press the annular portion 5 snugly against the interior of the cap D, the exterior of the reduced portion 3 of the stem and the interior of the cap being smooth, for an obvious purpose. In the form of our invention herein illustrated each of the annular portions 4 and 5 of the sealing device is provided with a feather edge and said sealing device is retained in the cap E by a metal collar F provided with a laterally-projecting flange 6 that is held against an annular shoulder on the interior of the cap D by a sleeve G which is arranged in the lower end portion of the cap D. This sleeve G is permanently connected to the cap D in any suitable way and it is provided with internal screw threads that co-operate with external screw threads 7 on the stem A. If desired, a flexible washer H can be arranged between the inner end of the sleeve G and the flange 6 on the collar F so as to form a gasket that bears against a shoulder 8 at the base of the reduced portion 3 of the stem A, when the cap D is mounted in its normal position on said stem. The stem A is provided with a nut I that is adapted to be screwed down against the felloe of the wheel, and if desired, said nut can be provided with a sleeve 9 that telescopes over the lower end portion of the cap E when said cap is arranged in operative position on the stem A, the sleeve 9 being herein illustrated as connected to the nut I by a swivel joint formed by an inwardly-projecting portion 9ª at the lower end of the sleeve 9 which projects into an annular recess in a reduced portion 10 on the top side of the nut I, thereby permitting the nut I to turn relatively to the sleeve 9. The air valve B is provided with a plunger portion 11 that projects upwardly through the valve seat C, so as to cause the valve B to be unseated when the chuck of the air hose is applied to the upper end of the stem A, during the operation of inflating the tire, and the member C that serves as a seat for the air valve is provided on its top side with one or more grooves 12 that establish communication between the air hose and the air passageway 1 in the stem A when the nipple on the chuck enters the upper end of the air passageway 1 in the stem.

To inflate the tire the cap D is removed and the chuck of the air hose is applied to the reduced portion 3 on the upper end of the stem A in the usual manner, thus causing the air valve B to be unseated so that air can pass from the source of supply into the tire through the air passageway 1 in the stem A. When the chuck of the air hose is removed from the stem A, the spring 2 will seat the valve B, thus temporarily retaining the pressure in the tire. Thereafter, the cap D is mounted in operative position on the stem A by screwing it down on said stem until the gasket H bears against the annular shoulder 8 on said stem. As the valve B is not relied upon to retain the pressure in the tire, some air leaks past said valve and accumulates in the cap D, thus building up pressure in said cap, which causes the annular portions 4 and 5 of the sealing device E to be held pressed tightly against the exterior of the reduced portion 3 of the stem A and the interior of the cap D, and consequently, sealing the space or joint between the cap D and stem A so effectively that no air can escape through said joint.

Such a valve structure is a decided improvement on the conventional valve structure now universally used on pneumatic tires, owing to the fact that the part which is relied upon to retain the pressure in the tire consists of a rugged flexible member E that is not liable to wear out quickly and which has sufficient area to prevent it from being rendered inoperative by a small particle of dust lodging on same. The structure as an entirety can be manufactured at as low a cost as the conventional pneumatic tire valve structure, and as it dispenses with one cap on the valve stem A, to wit, the conventional valve cap, it reduces the time and labor of inflating a pneumatic tire. While we have stated that the sealing device E is preferably provided with two annular spaced portions, one of which is held against the interior of the cap D and the other against the exterior of the valve stem A by the internal pressure in the cap D, it is, of course, obvious that our broad idea is not limited to a valve structure provided with a sealing device of this particular design or arrangement, but, on the contrary, contemplates the use of any suitable flexible sealing device arranged in such a manner that it will be maintained in operative condition by internal pressure created in the cap D by the air which escapes through the air passageway in the stem A on which the cap is mounted.

Having thus described our invention, what we claim and desire to secure by Letters Patent is:

1. A valve structure for pneumatic tires, comprising a stem provided with an air passageway, a removable cap on said stem that encases the upper portion of same, means operated by the internal pressure in said cap for sealing the joint between said cap and stem, and means for preventing the air from rushing out of the tire when the cap is removed from said stem.

2. A valve structure for pneumatic tires, comprising a stem provided with an air passageway, a removable cap that encases the upper portion of the stem, a flexible sealing device acted upon by air that escapes through the air passageway in the stem for preventing air from escaping from the joint between the stem and cap, and means for retarding the escape of air from the tire through the passageway in said stem.

3. A valve structure for pneumatic tires, comprising a stem provided with an air passageway, a removable cap on said stem that encases the upper portion of same and having a portion that is separated from the stem by an annular space, a device for sealing said annular space that is maintained in operative condition by the internal pressure in the cap, and a valve for retarding the escape of air from the tire through the air passageway in the stem.

4. A valve structure for pneumatic tires, comprising a stem provided with an air passageway, a valve for retarding the escape of air from the tire through said passageway, a removable cap encasing the upper portion of said stem, and a sealing device in said cap provided with a flexible tubular portion that is held pressed tightly against the stem by the internal pressure in the cap.

5. A valve structure for pneumatic tires, comprising a stem provided with an air passageway, a valve for retarding the escape of air from the tire through said passageway, a removable cap on said stem that encases the upper portion of same, and a sealing device in said cap provided with two concentrically arranged, annular portions that are adapted to be held pressed tightly against the interior of the cap and the exterior of the stem by the internal pressure in the cap.

6. A valve structure for pneumatic tires, comprising a stem provided with an air passageway, a removable cap encasing the upper portion of said stem and provided with a gasket that bears against a shoulder on the stem, a flexible sealing device arranged between said gasket and the top of the cap and adapted to be maintained in operative condition by the internal pressure in the cap, and means that retards the escape of air from the tire through the passageway of said stem.

7. A valve structure for pneumatic tires, comprising a stem provided with an air passageway, means for retarding the escape of the air from the tire through said passageway, a removable cap encasing the upper portion of the stem and separated from same by an annular space, and a flexible sealing device in said space provided with two feather edged, tubular portions that are held pressed tightly against the exterior of the stem and the interior of the cap by the internal pressure in the cap.

8. A valve structure for pneumatic tires, comprising a stem provided with an air passageway, a valve for retarding the escape of air from the tire through said passageway, a reduced portion at the upper end of said stem, a shoulder at the base of said reduced portion, a removable cap on said stem provided with a gasket that bears against said shoulder, and a flexible sealing device in said cap that is held pressed tightly against the exterior of the reduced upper portion of the stem by the internal pressure in said cap.

9. A valve structure for pneumatic tires, comprising a stem provided with an air passageway, a spring-pressed valve in said air passageway provided with means for maintaining the valve unseated during the operation of inflating the tire, a reduced portion at the upper end of said stem, a shoulder on the stem at the base of said reduced portion, a removable cap on the stem provided with a gasket that bears against said shoulder, and a sealing device in the cap provided with two concentrically arranged, flexible portions, one of which surrounds the reduced portion on the stem, said sealing device being adapted to be held pressed tightly against the cap and the stem by the internal pressure in the cap.

10. A valve structure for pneumatic tires, comprising a stem provided with an air passageway, a spring-pressed valve for retarding the escape of air from the tire through said passageway, a removable cap on said stem provided with a flexible sealing device that is maintained in operative condition by the internal pressure in the cap, and a felloe engaging nut on said stem provided with a sleeve that is arranged in telescopic engagement with said cap.

11. A valve structure for pneumatic tires, comprising a stem provided with an air passageway, a valve seat in said passageway, a spring-pressed valve in said passageway that co-operates with said seat, a plunger portion on said valve that projects upwardly through the valve seat member, a reduced portion at the upper end of said stem provided at its base with a shoulder, a flexible sealing device in said cap provided with portions that are held pressed tightly against the interior of the cap and the exterior of the reduced portion of the stem by the internal pressure in the cap, and means for retaining said sealing device in said cap.

JOHN KELLEY.
CHARLES RAYMOND.